United States Patent Office 2,965,405
Patented Dec. 20, 1960

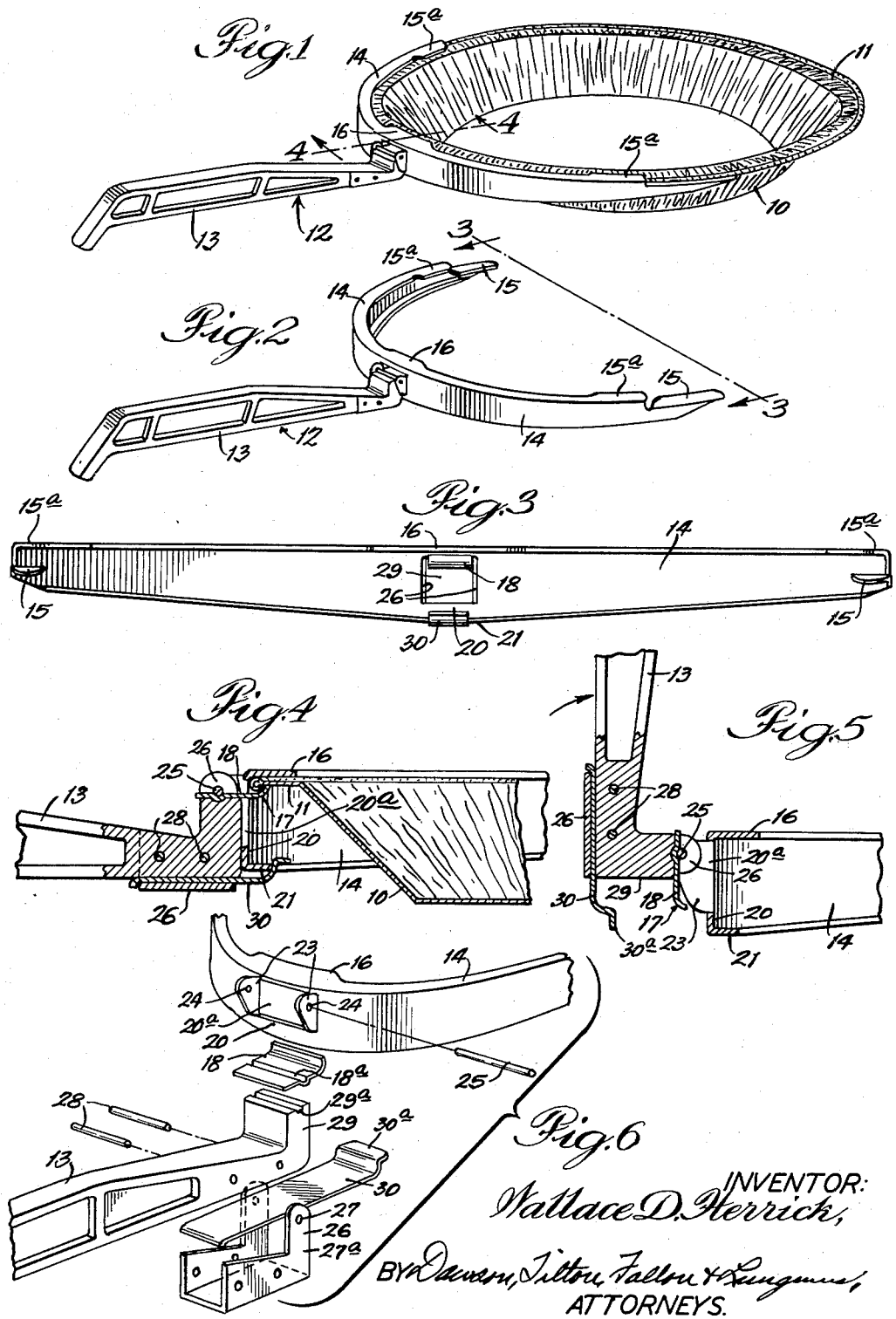

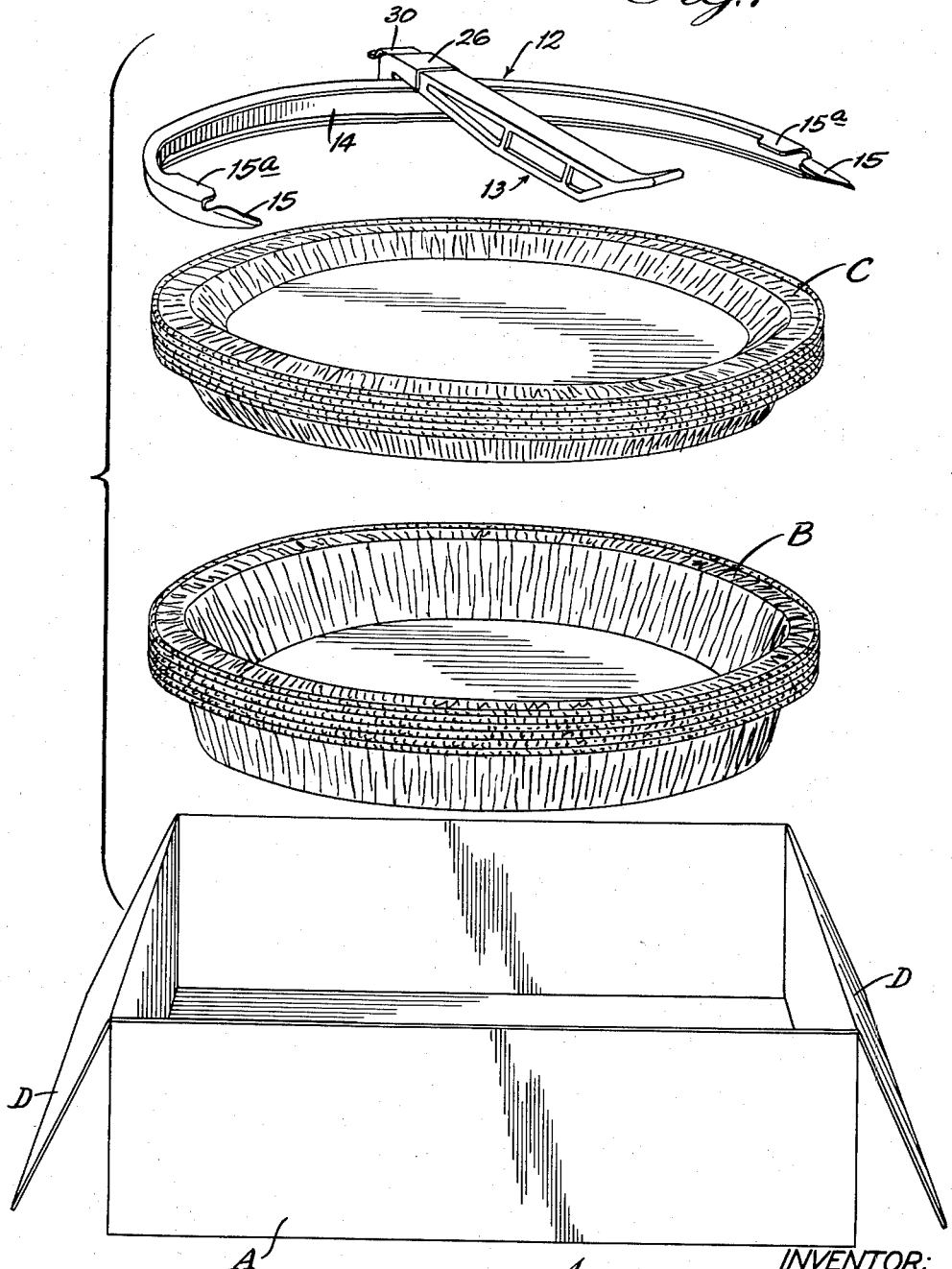

2,965,405
UTENSIL

Wallace D. Herrick, Wichita, Kans., assignor to The Coleman Company, Inc., Wichita, Kans., a corporation of Kansas Filed July 8, 1958, Ser. No. 747,250

13 Claims. (Cl. 294—31)

This invention relates to a utensil and, more particularly, to a utensil equipped with an outwardly extending flange and to a handling device therefor.

This invention can be employed in the use of such utensils as pie pans or the like, and especially where these utensils are of a disposable nature. For example, large quantities of food are currently being marketed in aluminum pans which have an outwardly extending flange portion. These foods may be desserts, full course dinners, etc. Because of the disposable nature of such pans, they are attractive for picnics, camping, and other outdoor affairs. Ordinarly, however, foods require heating so there is a problem in handling such utensils. Disposable utensils are also attractive for outdoor cooking of foods not initially provided therein, such as hamburgers, but again, the handling problem is present. Therefore, many people put up with a sooty, greasy fry pan that has to be taken home and cleaned. It would therefore be desirable if a utensil could be provided in which the cooking portion is disposable but which can be readily handled at all times. The provision of such a utensil is one of the principal objects of this invention.

Another object is to provide a novel utensil in which a handle is detachably connected to the cooking portion thereof. Still another object is to provide a utensil in which the handle is adapted to be connected to utensil cooking portions of various sizes. Yet another object is to provide a novel product including an assortment of utensil cooking portions along with handling means therefor. Another object is to provide in the product described in the object immediately preceding, utensil cooking portions of a disposable nature.

A further object of this invention is to provide a novel utensil-supporting device. Another object is to provide a novel utensil-supporting device which is adapted to support a device equipped with an outwardly extending flange. A still further object is to provide a handle support for a utensil equipped with an outwardly extending flange, such as a pie pan or the like, in which the device not only provides a handle but additionally rigidifies and supports a substantial portion of the utensil. A yet further object is to provide a device for attachment to utensils, the device being convertible into a compact arrangement for ready storage when not in use. Other objects and advantages of this invention can be seen as this specification proceeds.

This invention will be explained in conjuction with an illustrated embodiment in the accompanying drawing, in which—

Fig. 1 is an elevational view of a utensil embodying the teachings of the invention;

Fig. 2 is a view similar to Fig. 1, but showing the cooking portion-supporting device disassociated from the utensil;

Fig. 3 is an end elevational view taken along the line 3—3 of Fig. 2;

Fig. 4 is an enlarged fragmentary cross-sectional view taken longitudinally of the handle portion of the device;

Fig. 5 is a view similar to Fig. 4, but showing the elements of the handling device in a different operative position;

Fig. 6 is an exploded, fragmentary perspective view of the handling device shown in the previous figures; and Fig. 7 is an exploded, perspective view of a new product including an assortment of utensil cooking portions and a handling device therefor.

In the illustration given, the numeral 10 designates the food-holding portion of a utensil which is shown in the form of a pie pan, i.e., a relatively shallow dish having outwardly sloped side walls and an outwardly extending or annular flange 11. In the pan 10 illustrated, the outwardly extending flange 11 extends about the entire circular periphery of pan 10. Pan 10 may be made of very thin aluminum so as to be readily disposable. However, it is to be noted that other food-holding devices may be used with equal facility in the practice of the invention.

The supporting device portion of the invention, in the illustration given, is designated generally by the numeral 12 and includes a handle 13 pivotally connected to a frame 14. As can be best seen in Fig. 2, frame 14 has inwardly extending portions 15 adjacent the ends of frame 14 that are adapted to underlie the outwardly extending flange 11 of pan 10, and a centrally disposed, inwardly extending portion 16 that is adapted to overlie flange 11.

The numeral 17 designates generally a means for clamping flange 11 to the under side of portion 16, and can be most readily seen in Figs. 4 and 5. In those figures, the numeral 18 designates a resilient movable jaw provided as part of handle 13 and which clamps flange 11 to the under side of inwardly extending portion 16, as at 19 in Fig. 4.

The frame 11, as pictured, is generally channel-shaped in cross-section. The channel-shaped frame 14 includes a back portion 20, a lower leg portion 21, and the upper leg portion 22.

The back portion 20 of frame 14 is equipped with a cut-out portion or opening 20a, and equipped at the sides thereof with ears 23 (best seen in Fig. 6). Mounted within openings 24 of ears 23 is a shaft 25 which may be rigidly supported by ears 23 as by riveting the ends of shaft 25.

Handle 13 is pivotally mounted on shaft 25 by means of shaft bracket 26 which is equipped with aligned openings 27 in lugs 27a which are integral with bracket 26, openings 27 receiving shaft 25 to permit bracket 26 to pivot thereabout. Bracket 26 is secured to handle 13 by means of pins 28 which extend through aligned openings in both bracket 26 and handle 13, all of which can be readily appreciated from a consideration of Fig. 6.

The upper portion 29 of handle 13 is grooved as at 29a in alignment with shaft 25 and supported on the upper surface of portion 29 is resilient movable jaw 18, also equipped with a groove 18a. Thus, pivoting of handle 13 upwardly moves the movable jaw 18 from the position seen in Fig. 4 to the position of the jaw 18 seen in Fig. 5. In the position of the elements of the device 12 seen in Fig. 4, the resilient movable jaw 18 extends through opening 20a in frame 14.

Means for locking the handle 13 in the position seen in Fig. 4 is provided in the form of a resilient locking member 30. Member 30 is secured in place between bracket 26 and handle 13 and is equipped with a stepped portion, as at 30a, which is adapted to engage the lower leg 21 of the channel-shaped frame, as can be best seen in Fig. 4. The resiliency of member 30 permits it to "snap" into place and also be disengaged from leg 21 in the same manner.

The handle 13 is rotatable from the position seen in Fig. 4 through the position seen in Fig. 5 to the position shown in Fig. 7, at which time handle 13 lies approximately between portions 15 of frame 14. As such, the device can be compactly stored when not in use. Thus, handle 13 is rotatable over an arc or about 180° from the "use" position to the "storage" position. If desired, the angle of rotation can be less depending on the desired orientation of the handle 13 during cooking or the like.

In the operation of the supporting portion 12, a circular pan such as is designated 10 and equipped with a perimetric flange 11, is inserted within the confines of the channel-shaped frame 14, the frame being contoured to conform with the perimetric shape of utensil 10. The utensil 10 is readily fitted within frame 14 in a position underlying the top leg 22 which also includes top support portions 15a adjacent the ends thereof and adjacent the inwardly extending portions 15 which are adapted to underlie the perimetric flange 11. Here it is to be appreciated that it is unnecessary to make sure that the perimetric flange 11 is completely flush at all points with the under surface of top leg 22, although such will be generally the case due to the cooperation of portions 15 and 15a in guiding the utensil 10 into position within frame 14. However, should the utensil 10 be slightly "cocked" with respect to the horizontal plane of frame 14, the pan 10 will be brought into co-planar relation with frame 14 when handle 13 is pivoted downwardly from the position shown in Fig. 5 to the position shown in Fig. 4. During this operation, the lower jaw 18 engages the perimetric flange 11 and forces it upwardly into engagement with the under surface of inwardly extending portion 16, as is seen at 19 in Fig. 4. Simultaneously with this operation, the handle also brings about the locking engagement of member 30 with the bottom leg 21 of frame 14.

From this, it is to be seen that a positive support for the pan is afforded over a considerable portion of its perimeter and without having any portion of the handle support extending into the food-supporting portion of the utensil. Thus there is no contact with the material in the pan by the portion 12.

Through the structure presented, it is possible for a user of the device to disengage it from a used plate, pan or utensil without having to touch the dirty plate or utensil. For disengagement and disposal of the utensil, it is only necessary to press the bottom of the plate against a table or the edge of a trash barrel or the like and raise the handle to the unlocked position, using the plate as a fulcrum. Thereafter, the detached handle support can be folded, as indicated above, and placed over the remaining store of plates or utensils, as the case may be.

A product making available the advantages of the invention can be seen in Fig. 7. Therein, a case or carton A is adapted to receive a stock of pans B and a second stock of pans C, in this case pans B and C having the same diameter but different depths. The handling portion 12 is also receivable within carton A which can then be closed by side flaps D and a hinged cover (not shown). It is to be appreciated that a larger assortment of pans can be conveniently provided in the compact form shown so that all the picnicker or camper need do is keep the carton A in his car trunk and, as the occasion demands, remove the required ready-to-operate yet disposable utensil.

While in the foregoing specification I have set forth an embodiment of the invention in considerable detail for the purpose of explanation, it will be understood that many changes in the details thereof may be made by those skilled in the art without departing from the spirit and scope of the invention.

I claim:

1. In a device for supporting a utensil equipped with an outwardly extending flange, a frame adapted to receive said flange while extending about a portion of the perimeter of said utensil, said frame having spaced-apart portions adapted to bear against one side of said flange and a portion intermediate said spaced-apart portions adapted to bear against the other side of said flange, locking means on said frame aligned with said intermediate portion for cooperation therewith in clamping said flange, and a handle on said frame.

2. The structure of claim 1 in which the said handle is pivotally mounted on said frame and rotatable over an arc of about 180°.

3. The structure of claim 1 in which the said handle is pivotally mounted on said frame and is operative to actuate said locking means.

4. The structure of claim 3 in which said locking means is secured to said handle and is also operative to maintain said handle in a utensil-carrying position.

5. In a handle support for a utensil equipped with an outwardly extending flange, a frame having generally a channel shape in cross-section and adapted to receive said flange under the upper leg of said channel, a clamp member pivotally supported on the back of said channel and extending both inwardly and outwardly of said frame through an opening in the channel back, the outwardly extending portion of said member providing a handle operative to pivot the inwardly extending portion into clamping relation with said upper leg to support said flange therebetween.

6. The structure of claim 5 in which the said channel back is equipped with a pair of outwardly extending ears on opposite sides of said opening, said clamp member being pivotally supported between said ears.

7. The structure of claim 5 in which said clamp member is equipped with an inwardly extending resilient lock member engageable with the lower leg of said channel.

8. In a handle support for a utensil equipped with a perimetric flange, a frame contoured to conform to said perimetric flange over a substantial portion thereof, said frame having integral laterally extending portions at the ends thereof adapted to underlie said flange and having an integral laterally extending portion intermediate the ends thereof adapted to overlie said flange, a handle on said frame adapted to extend laterally thereof in a direction opposite to said laterally extending portions, and resilient clamping means in said frame operative to bear against the under surface of said flange adjacent said intermediate portion.

9. The structure of claim 8 in which the said handle is pivotally mounted on said frame and rotatable to a position between said ends for compact storage of said support when not in use.

10. The structure of claim 8 in which the frame is generally semi-circular.

11. The structure of claim 8 in which the said handle carries said clamping means and also carries means for locking said handle in utensil-carrying position.

12. A removable handle for a utensil having an outwardly-extending flange comprising an arcuate frame adapted to support said flange at spaced-apart points and without extending into said utensil, and handle means pivotally mounted on said frame aligned with one of said points and cooperating with said frame at said one point to clamp said flange.

13. A removable handle for a utensil having an outwardly-extending flange comprising a frame having a laterally-extending lip adapted to overlie said flange, a clamp member pivotally mounted on said frame and rotatable into clamping relation with said lip, and a handle secured to said clamp member and extending laterally outward of said frame in a direction opposite to said lip, said handle being equipped with a resilient locking member engageable with said frame when said clamp member is in clamping relation with said lip, said frame being generally channel-shaped in cross section with the lower leg of the channel providing the portion of the frame engaged by said resilient locking member.

References Cited in the file of this patent

UNITED STATES PATENTS

| | | |
|---|---|---|
| 1,505,258 | Hagen | Aug. 19, 1924 |
| 1,578,816 | Eifried | Mar. 30, 1926 |
| 2,613,979 | Stillabower | Oct. 14, 1952 |